US012568395B2

(12) United States Patent
Watts et al.

(10) Patent No.: US 12,568,395 B2
(45) Date of Patent: Mar. 3, 2026

(54) METHOD AND SYSTEM FOR CONGESTION NOTIFICATION IN TRANSPORT NODES

(71) Applicant: Verizon Patent and Licensing Inc., Basking Ridge, NJ (US)

(72) Inventors: Mark T. Watts, Newport, RI (US); David Gene Watkins, Greensburg, PA (US); Luay Jalil, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 522 days.

(21) Appl. No.: 18/149,790

(22) Filed: Jan. 4, 2023

(65) Prior Publication Data

US 2024/0224114 A1 Jul. 4, 2024

(51) Int. Cl.
| | |
|---|---|
| *H04L 12/28* | (2006.01) |
| *H04W 28/02* | (2009.01) |
| *H04W 40/02* | (2009.01) |

(52) U.S. Cl.
CPC ....... *H04W 28/0284* (2013.01); *H04W 40/02* (2013.01)

(58) Field of Classification Search
CPC .......................... H04W 28/02; H04W 28/0284
See application file for complete search history.

(56) References Cited

U.S. PATENT DOCUMENTS

| | | | | |
|---|---|---|---|---|
| 9,282,352 | B2 * | 3/2016 | McDysan | .............. H04N 21/24 |
| 12,021,756 | B2 * | 6/2024 | Nádas | ...................... H04L 47/36 |
| 2008/0008168 | A1 * | 1/2008 | Nadeau | ................... H04L 69/22 |
| | | | | 370/389 |
| 2019/0297527 | A1 * | 9/2019 | Liu | ........................ H04W 28/02 |

FOREIGN PATENT DOCUMENTS

WO WO-2014005557 A1 * 1/2014 ............. H04L 47/31

OTHER PUBLICATIONS

Shahzad et al., Enhanced Explicit Congestion Notification (EECN) in TCP with P4 Programming, 2020, IEEE, pp. 35-40. (Year: 2020).*

Brunello et al., Low Latency Low Loss Scalable Throughput in 5G Networks, 2021, IEEE, 7 pages. (Year: 2021).*

* cited by examiner

*Primary Examiner* — Elisabeth Benoit Magloire

(57) ABSTRACT

A method, a network device, and a non-transitory computer-readable storage medium are described in relation to a transport congestion control notification service. The transport congestion control notification service may include providing congestion notification by a network device according to a schedule. The congestion notification may be implemented as explicit congestion notification bits included in packets. The schedule may govern the starting and stopping of the congestion notification. The schedule may be generated based on historical congestion states of relevance to the network device. The schedule may be generated by the network device or by an external device and provisioned at the network device.

20 Claims, 11 Drawing Sheets

125

600

700

| OBTAIN CONGESTION STATE INFORMATION AND NETWORK TOPOLOGY INFORMATION 705 |

| ANALYZE THE STATE INFORMATION AND THE NETWORK TOPOLOGY INFORMATION 710 |

| GENERATE A SCHEDULE FOR A TRANSPORT DEVICE TO PROVIDE CONGESTION NOTIFICATION 715 |

| TRANSMIT THE SCHEDULE TO THE TRANSPORT DEVICE 720 |

METHOD AND SYSTEM FOR CONGESTION NOTIFICATION IN TRANSPORT NODES

BACKGROUND

Development and design of networks present certain challenges from a network-side perspective and an end device perspective. For example, Next Generation (NG) wireless networks, such as Fifth Generation New Radio (5G NR) networks are being deployed and are under development. Congestion control in NG wireless networks and legacy wireless networks remains an ongoing issue.

DETAILED DESCRIPTION

Figure 1:
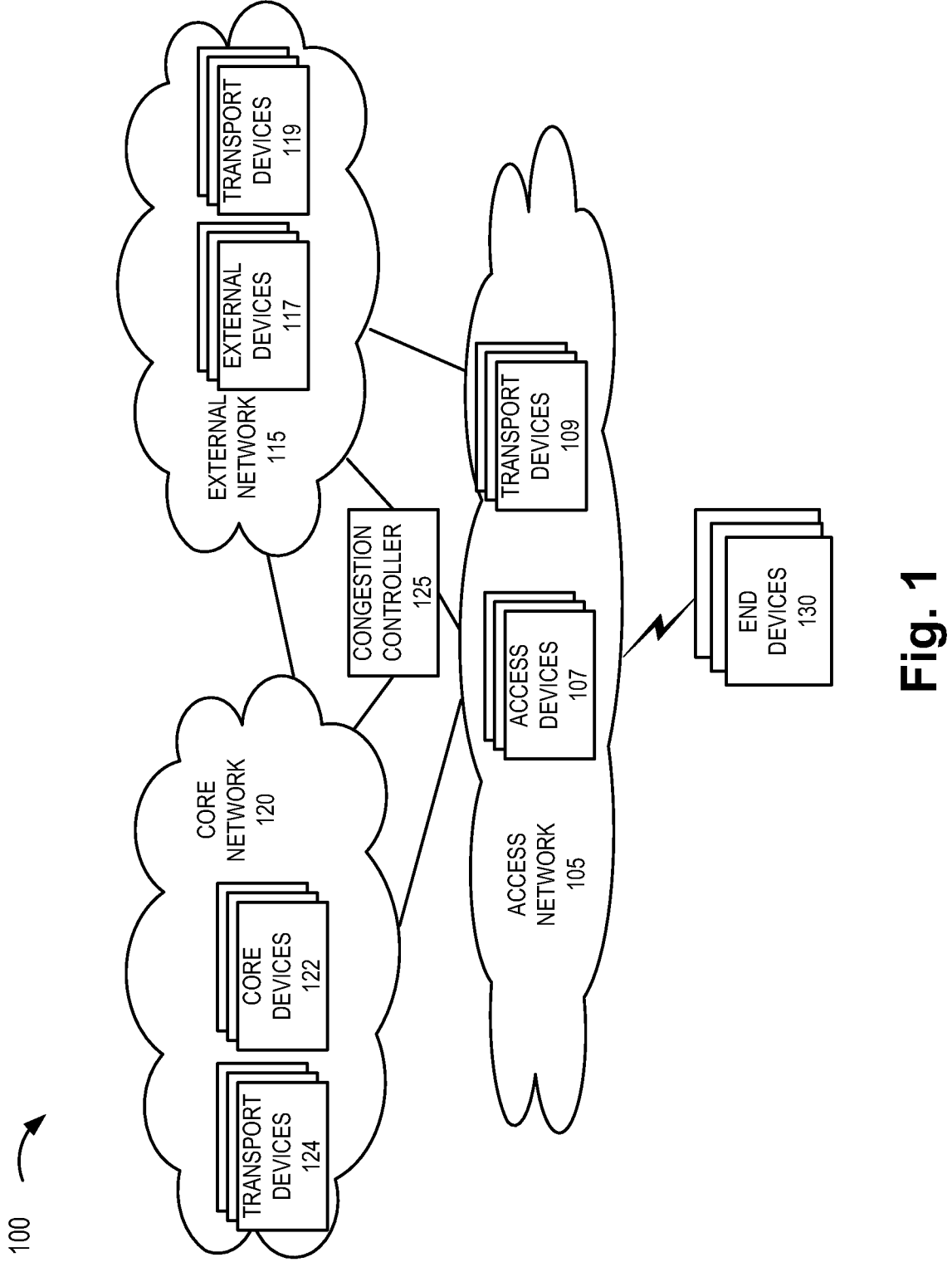
FIG. 1 is a diagram illustrating an exemplary environment in which an exemplary embodiment of a transport congestion control notification service may be implemented.

The following detailed description refers to the accompanying drawings. The same reference numbers in different drawings may identify the same or similar elements. Also, the following detailed description does not limit the invention.

Congestion control is one aspect of network management. Congestion in a network can negatively impact communication between devices. According to one approach, a network device of a Transmission Control Protocol/Internet Protocol (TCP/IP) network may respond to network congestion by dropping packets. Dropped packets may signal the TCP/IP network that congestion is occurring and, as a result, a packet transmission rate may be reduced. Unfortunately, packets that are dropped will have to be retransmitted. Also, some types of traffic (e.g., bursty traffic, etc.) may cause the TCP/IP network to overly reduce the transmission rate, which results in inefficient bandwidth utilization and reduction in latency.

One mechanism used to signal network congestion without dropping packets is Explicit Congestion Notification (ECN). ECN enables end-to-end notification of network congestion between two endpoints (e.g., an ECN-enabled sender and an ECN-enabled receiver) communicating via the TCP/IP network. ECN also requires that each intermediary device along the transmission path between the two endpoints support ECN. For example, packets may be marked by a sending endpoint, which uses the two least-significant bits in the differentiated services (DiffServ) field of the IP header, to indicate the packets as ECN-capable.

In recent years, a new Internet service called Low Latency Low Loss Scalable Throughput (L4S) has been proposed to provide scalable sources with ultra-low latency over the network. An L4S service may use a codepoint (e.g., ECT (1) or "01" to indicate ECN-Capable Transport (L4S)) of the ECN codepoints and a codepoint (e.g., congestion experienced (CE) or "11") to indicate congestion as an explicit congestion signal. In contrast, for classic ECN codepoints, the codepoint "01" may mean that the packet is ECT supported, the codepoint "10" means that the packet is ECT enabled, and the codepoint "11" is CE. However, for L4S traffic for example, transport nodes, such as a router or another type of network device, does not initiate (L4S) ECN bit remapping on the user plane because the (L4S) ECN bits may be encapsulated by other protocol messages, such as GPRS Tunneling Protocol (GTP), Multiprotocol Label Switching (MPLS), and/or another outer Internet Protocol (IP) transport protocol message. As such, the transport node may not mark IP user data traffic as congested even if a communication link is congested and conversely may not unmark IP user data traffic as uncongested even if a communication link is uncongested.

According to exemplary embodiments, a transport congestion control notification service is described. According to an exemplary embodiment, the transport congestion control notification service may be implemented in various networks that may include a transport node, as described herein, such as an access network or a radio access network (RAN), a core network, and/or an application layer network, as described herein. According to an exemplary embodiment, the transport node may be implemented as a router, as described herein. The router may be implemented as a virtual router, a physical router, and/or a logical router. According to other exemplary embodiments, the transport congestion control notification service may be implemented in other types of network devices. For example, the network device may be implemented as an intermediary network device between a source device and a destination device.

According to an exemplary embodiment, the transport congestion control notification service may be provided to only L4S traffic. According to other exemplary embodiments, the transport congestion control notification service may be provided to non-L4S traffic in addition to L4S traffic. For example, non-L4S traffic may include email, web-browsing, and/or other types of traffic that may be marked with best effort or even less than less than best effort priority markings.

According to an exemplary embodiment, the transport congestion control notification service includes congestion notification by the transport node. According to an exemplary embodiment, the transport congestion control notification service may provide the congestion notification based on a time-based schedule, as described herein. In this way, the transport node may not provide congestion notification for all traffic at all times.

According to an exemplary embodiment, the transport congestion control notification service may be implemented as on-board logic, as described herein. For example, the on-board logic may learn when to trigger or invoke the transport congestion control notification service. According to another exemplary embodiment, the transport congestion control notification service may include an artificial intelligence and/or machine learning (AI/ML) device that may learn when to trigger or invoke the transport congestion control notification service. For example, the AI/ML device may directly or indirectly notify the router or another type of network device to start and stop the transport congestion control notification service relative to traffic traversing the router or the other type of network device. Additionally, or alternatively, the AI/ML device may directly or indirectly provision the router or another type of network device with a time-based schedule that may govern when the transport congestion control notification service starts and stops.

According to an exemplary embodiment, the transport congestion control notification service of the router may include determining whether there is congestion or not, decapsulating a packet of its outer IP messages, and reading the congestion notification bits included in the packet. When the congestion notification bits accurately indicate the determined congestion state (e.g., congestion or no congestion), the transport congestion control notification service may include (re)-encapsulating the outer IP messages, and routing the packet towards its destination. However, when the congestion notification bits do not accurately indicate the determined congestion state (e.g., congestion or no congestion), the transport congestion control notification service may alter the bits to accurately indicate the congestion state, (re)-encapsulate the outer IP messages, and route or transmit the packet towards its destination.

In view of the foregoing, the transport congestion control notification service may improve the delivery of traffic end-to-end. For example, routers or another type of intermediary network device may contribute to congestion notification and may assist in congestion control of traffic. Additionally, the transport congestion control notification service may efficiently and effectively provide L4S messaging based on learned network conditions that enables congestion notification to be realistically implemented by routers included in network paths.

FIG. 1 is a diagram illustrating an exemplary environment 100 in which an exemplary embodiment of a transport congestion control notification service may be implemented. As illustrated, environment 100 includes an access network 105, an external network 115, and a core network 120. Access network 105 includes access devices 107 (also referred to individually or generally as access device 107) and transport devices 109 (also referred to individually or generally as transport device 109). External network 115 includes external devices 117 (also referred to individually or generally as external device 117) and transport devices 119 (also referred to individually or generally as transport device 119). Core network 120 includes core devices 122 (also referred to individually or generally as core device 122) and transport devices 124 (also referred to individually or generally as transport device 124). Environment 100 further includes a congestion controller 125 and end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

Although congestion controller 125 is depicted outside of access network 105, external network 115, and core network 120, such depiction is purely exemplary. Congestion controller 125 may be deployed, in whole or in part, in any of these networks.

Transport devices, such as transport devices 109, 119, and/or 124 may be included in fewer networks than those depicted (e.g., transport devices 119 and/or 124 may be omitted, etc.) or may be included in other networks (e.g., X-haul network, etc.) not specifically illustrated but described herein. According to other exemplary embodiments, congestion controller 125 may be omitted from environment 100. For example, a step, a function, and/or a process of congestion controller 125 pertaining to the transport congestion control notification service may be performed by each transport device (e.g., transport device 109, 119, and/or 124).

A network device or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the transport congestion control notification service may use at least one of these planes of communication. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a Wi-Fi network, a World-wide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Depending on the implementation, access network 105 may include one or multiple types of network devices, such as access devices 107. For example, access device 107 may include a next generation Node B (gNB), an evolved Long Term Evolution (eLTE) evolved Node B (eNB), an eNB, a radio network controller (RNC), a RAN intelligent controller (RIC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a WiMax device, a hotspot device, a fixed wireless access customer premise equipment (FWA CPE) that provides a wireless access service.

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), network function virtualization infrastructure (NFVI), and/or other types of virtualization elements, layers, hardware resources, operating systems, engines, etc.) that may be associated with application services for use by end devices (not illustrated). By way of further example, external devices 117 may include mass storage devices, data center devices, NFV devices, SDN devices, cloud computing devices, platforms, and other types of network devices pertaining to various network-related functions (e.g., security, management, policy charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF) (which may include a NW-TT), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), a lifecycle management (LCM) device, a TSCTSF, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, at least some of transport devices 109, transport devices 119, and transport devices 124 include logic of an exemplary embodiment of the transport congestion control notification service, as described herein. According to an exemplary embodiment, transport device 109, transport device 119, and transport device 124 may each be implemented as a router. According to an exemplary embodiment, while at least some of access devices 107, external devices 117, and core devices 122 may each include routing capabilities, for purposes of description and illustration, transport device 109, transport 119, and transport device 124 are distinguishable from such other network devices. According to yet other exemplary embodiments, transport devices 109, 119, and/or 119 may be implemented as access device 107, external device 117, core device 122, and/or another type of intermediary network device, as described herein.

According to an exemplary embodiment, transport device 109, transport device 119, and transport device 124 may each configure (L4S) ECN bit(s) in packets based on a state of congestion detected and the transport congestion control notification service of congestion controller 125, as described herein. According to an exemplary embodiment, the transport congestion control notification service may manage congestion notification based on a time-based control mechanism. For example, the time-based control mechanism may be implemented as a learned schedule pertaining to the congestion state of a network device (e.g., transport device 109, etc.) and/or a component of the network device (e.g., a queue and/or a buffer of transport device 109, a communication interface of transport device 109, etc.), a communication link, a network path, a segment of a network path, a network slice, a subnetwork slice (e.g., a RAN slice, a core slice, etc.), a quality of service (QOS) flow, a flow of packets, and/or another type of network element (e.g., an application service session, a packet data unit (PDU) session, etc.) relative to a period of time. According to an exemplary embodiment, the learned schedule may be generated for each transport device 109, transport device 119, and transport device 124. The learned schedule may be the same or different between transport devices 109, between transport devices 119, between transport devices 124 and/or between transport devices 109 and transport devices 119, between transport devices 119 and transport devices 124, and so forth.

According to an exemplary embodiment, transport device 109, transport device 119, and transport device 124 may each configure (L4S) ECN bit(s) during the allotted time period of the learned schedule, for example. According to an exemplary embodiment, transport device 109, transport device 119, and transport device 124 may each configure ECN bit(s) for L4S traffic and not other types of traffic (e.g., non-L4S traffic).

According to an exemplary embodiment, transport device 109, transport device 119, and transport device 124 may each determine whether there is congestion or not, decapsulate a packet of its outer IP messages, and read the congestion notification bits included in the packet. When the congestion notification bits accurately indicate the determined congestion state (e.g., congestion or no congestion), transport device 109, transport device 119, and transport device 124 may each re-encapsulate the outer IP messages, and route the packet towards its destination. However, when the congestion notification bits do not accurately indicate the determined congestion state (e.g., congestion or no congestion), transport device 109, transport device 119, and transport device 124 may each alter the bit(s) to accurately indicate the congestion state, re-encapsulate the outer IP messages, and route the packet towards its destination.

Congestion controller 125 may include a network device that provides an exemplary embodiment of the transport congestion control notification service. For example, congestion controller 125 may generate the learned schedule based on an analysis of state information and network topology information, as described herein. According to various exemplary embodiment, congestion controller 125 may obtain state information from one or multiple sources, such an NWDAF, a RIC device, access device 107, external device 117, core device 122, transport device 109, transport device 119, transport device 124, and/or a network performance management system. The state information may include congestion values that pertain to a network device, a communication link, a network path, a segment of a network path, a network slice, a subnetwork slice (e.g., a RAN slice, a core slice, etc.), a quality of service (QoS) flow, a flow of packets, a geographic area, and/or another type of network element (e.g., an application service session, a packet data unit (PDU) session, etc.) relative to a period of time.

According to various exemplary embodiments, congestion controller 125 may obtain the network topology information from a network management system, an orchestrator that may manage and provision virtual devices (e.g., access device 107, transport device 109, etc.), and/or a network performance system. The network topology information may indicate the type, number, and placement of access devices 107, external devices 117, core devices 122, and the transport devices (e.g., transport devices 109, 119, and 124). The network topology information may include network device identifiers, network slice identifiers, and/or other types of unique identifiers. The network topology information may indicate connectivity information pertaining to network devices and other types of network elements (e.g., logical, virtual, network slices, links, etc.) of a network, such as access network 105, external network 115, and core network 120. The network topology information may indicate placement of a network device according to geographic coordinates (e.g., latitude/longitude values, azimuth values) of a geographic coordinate system (GCS), or coordinate values associated with another type of coordinate system (e.g., a projected coordinate system (PCS), etc.). The network topology information may include map information. For example, the map information may indicate a geographic area (e.g., country, state, county, city, town, province, etc. The network topology information may include Voronoi-based area (e.g., a cell, a sector, a zone/sub-sector, etc.), geo-bin area, and/or another division of a geographic area representative of radio coverage, network service coverage, service area of core device 122, and so forth.

Congestion controller 125 may analyze the state information and the network topology information to generate the learned schedule that may be used by transport devices 109, transport devices 119, and transport devices 124 to provide the congestion notification of the transport congestion control notification service, as described herein.

End device 130 includes a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, etc.), a computer, a gaming device, a music device, an IoT device, a drone, a smart device, a fixed wireless device, a router, a sensor, an automated guided vehicle (AGV), an industrial robot, or other type of wireless device (e.g., other type of UE). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. According to an exemplary embodiment, end device 130 includes logic that supports ECN.

Figure 2:
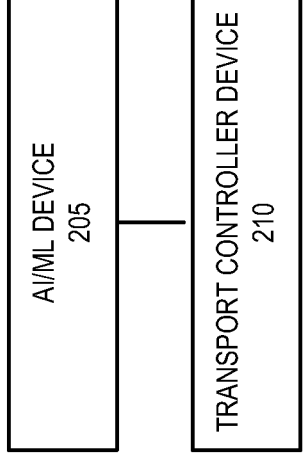
FIG. 2 is a diagram illustrating exemplary components of an exemplary embodiment of a congestion controller device depicted in FIG. 1.

FIG. 2 is a diagram illustrating exemplary components of an exemplary embodiment of congestion controller 125. As illustrated, congestion controller 125 may include an AI/ML device 205 and a transport controller device 210. According to other exemplary embodiments, congestion controller 125 may include additional, different, and/or fewer components than those illustrated and described to provide an exemplary embodiment of the transport congestion control notification service. According to other exemplary embodiments, multiple components may be combined into a single component. Additionally, or alternatively, a single component may be implemented as multiple components in which a process or a function may be collaboratively performed or multiple processes or functions may be split between them.

AI/ML device 205 may include a network device that calculates predictive and/or current congestion based on state information and network topology information, as described herein. The state information may pertain to current, predictive, and/or historical state information. AI/ML device 205 may include one or multiple types of models. For example, the models may include a time series model, a forecast model, a clustering model, and/or a classification model. The models may include a tree-based algorithm, a regressive algorithm, and/or another type of AI/ML algorithm or logic, such as Naïve Bayes, K-Nearest Neighbors, decision tree, Random Forest, gradient boosting, support vector machine, clustering via embedding, a dense neural network, a convolutional neural network, a recurrent neural network, and/or the like.

AI/ML device 205 may generate a schedule for a transport device (e.g., transport device 109, transport device 119, and/or transport device 124) based on an analysis of the state information and the network topology information. The schedule may indicate to the transport device when to provide the congestion control notification service. For example, the schedule information may include start and stop time information. The start and stop time information may include date information, day information, hour, minute, and/or second information. The schedule information may include a network identifier (e.g., a globally unique identifier) that identifies the transport device to which the schedule information pertains and/or a network address (e.g., an IP address of the transport device). According to an exemplary embodiment, AI/ML device 205 may provide the schedule to the transport device via transport controller device 210.

Transport controller device 210 may include a network device that facilitates the provisioning of the schedule to transport devices. For example, transport controller device 210 may provide a schedule to the transport device based on the network device identifier and/or the network address information included in the scheduling information. The transport device may provision the schedule and provide the congestion control notification service in accordance with the schedule. According to some exemplary embodiments, the transport device may provide the congestion control notification service beyond the schedule. For example, the transport device may continuously or periodically monitor congestion states regardless of whether the transport congestion control notification service is enabled or not. According to some exemplary embodiments, when the congestion state reaches a threshold value, the transport device may enable the transport congestion control notification service outside the schedule. According to some exemplary embodiments, the transport device may report the enablement and/or the subsequent disablement of the service (e.g., after the state of congestion abates) to AI/ML device 205. AI/ML device 205 may use the reported information to determine whether the schedule should be updated or not. Similarly, such procedures may be implemented according to other exemplary embodiments, in which the on-board logic of the transport device may enable and disable the service outside a period of time specified by the schedule. Accordingly, the transport congestion control notification service may include both proactive and reactive mechanisms associated with congestion notification.

Figure 3:
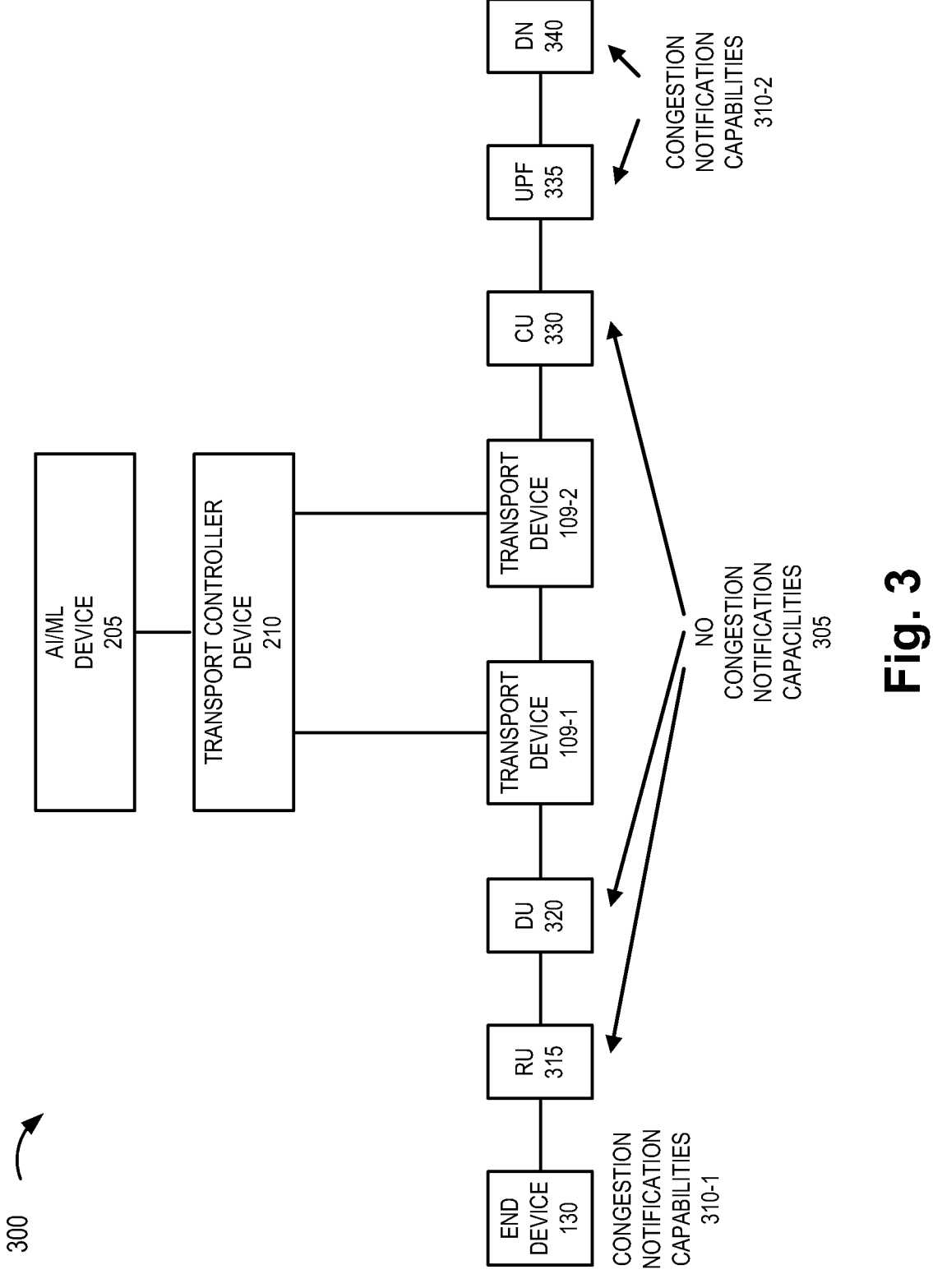
FIG. 3 is a diagram illustrating another exemplary environment in which an exemplary embodiment of a transport congestion control notification service may be implemented.

FIG. 3 is a diagram illustrating another exemplary environment 300 in which an exemplary embodiment of a transport congestion control notification service may be implemented. As illustrated, environment 300 may include AI/ML device 205, transport controller device 210, and end device 130. Environment 300 may include exemplary access devices 107, such as an RU 315, a DU 320, and a CU 330, an exemplary core device 122, such as a UPF 335, and an exemplary external network 115, such as a data network (DN) 340. Environment 300 further includes a transport device 109-1 and 109-2.

RU 315, DU 320, CU 330, and UPF 335 may provide a function and/or a service in accordance with a network standard, such as Third Generation Partnership Project (3GPP), 3GPP2, International Telecommunication Union (ITU), European Telecommunications Standards Institute (ETSI), GSM Association (GSMA), and the like and/or of a proprietary nature. DN 340 may be implemented as an application service layer network that may host an end device application service by an application server (not illustrated). As further illustrated, RU 315, DU 320, and CU 330 each do not have congestion notification capabilities 305. Additionally, for example, end device 130 may have congestion notification capabilities 310-1 and UPF 335 and DN 340, which may include an end device application server, may each have congestion notification capabilities 310-2. Transport devices 109-1 and 109-2 may include logic of an exemplary embodiment of the transport congestion control notification service, as described herein.

FIGS. 4A-4D are diagrams illustrating an exemplary process 400 of an exemplary embodiment of the transport congestion control notification service according to an exemplary scenario. As illustrated, process 400 may be implemented in environment 300, for example.

Figure 4A:
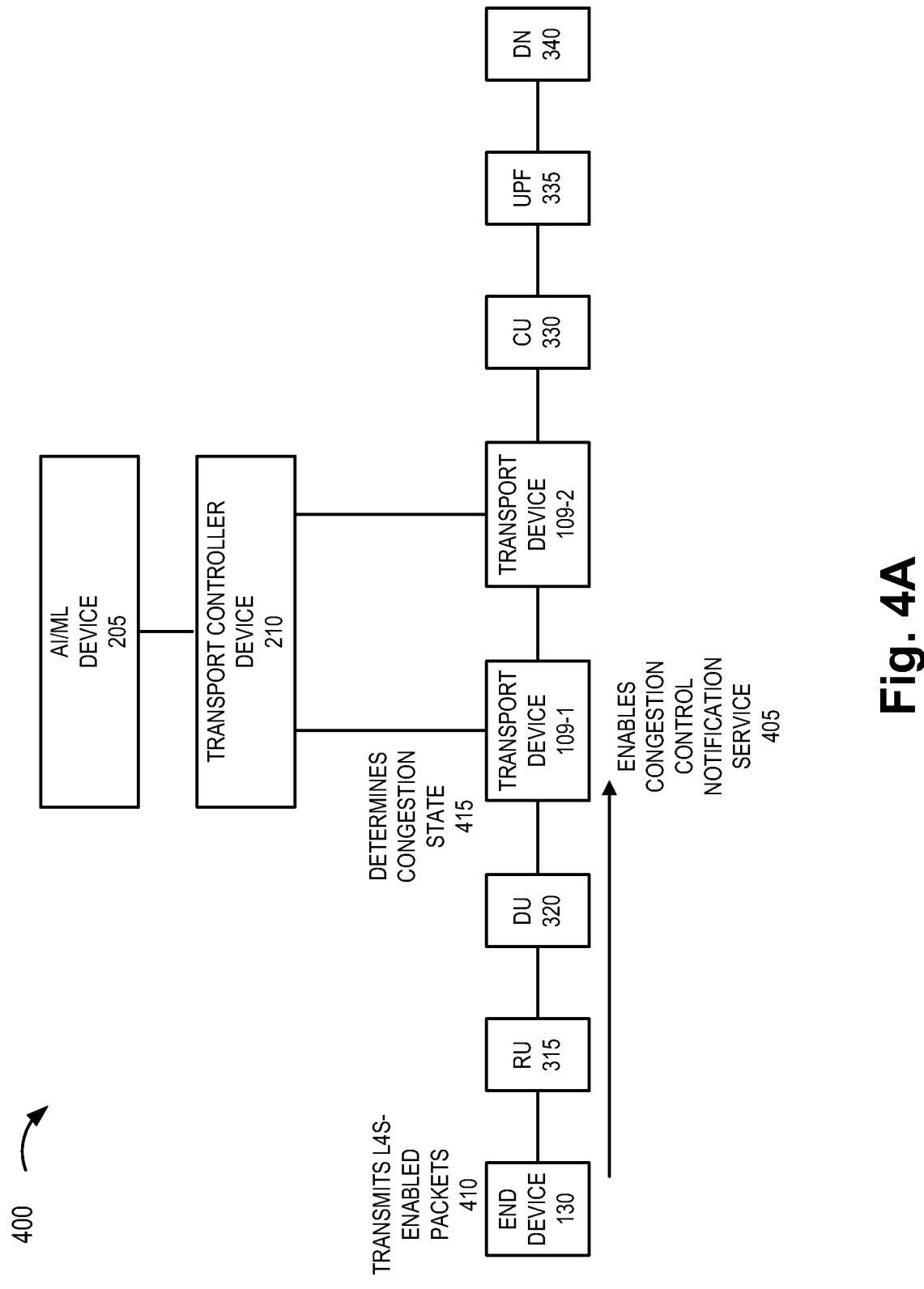
FIGS. 4A-4D are diagrams illustrating an exemplary process of an exemplary embodiment of the transport congestion control notification service.

Referring to FIG. 4A, transport device 109-1 may enable the congestion control notification service 405 based on a schedule, as described herein. For example, although not illustrated, AI/ML device 205 and transport controller device 210 may have previously provisioned a learned schedule at transport device 109-1. Subsequently, end device 130 may transmit L4S-enabled packets 410 to DN 340 via UPF 335. Transport device 109-1 may determine a congestion state 415. For example, transport device 109-1 may determine the congestion state at transport device 109-1 and/or relative to a network element, as described herein. As an example, transport device 109-1 may determine the congestion state relative to the transmitted L4S-enabled packets. Additionally, according to an exemplary embodiment, transport device 109-1 may update a transport routing schedule for packets responsive to the enablement of the congestion control notification service and associated time to provide the congestion notification service (e.g., de-encapsulation, re-encapsulation, resetting ECN bits, etc.).

Figure 4B:
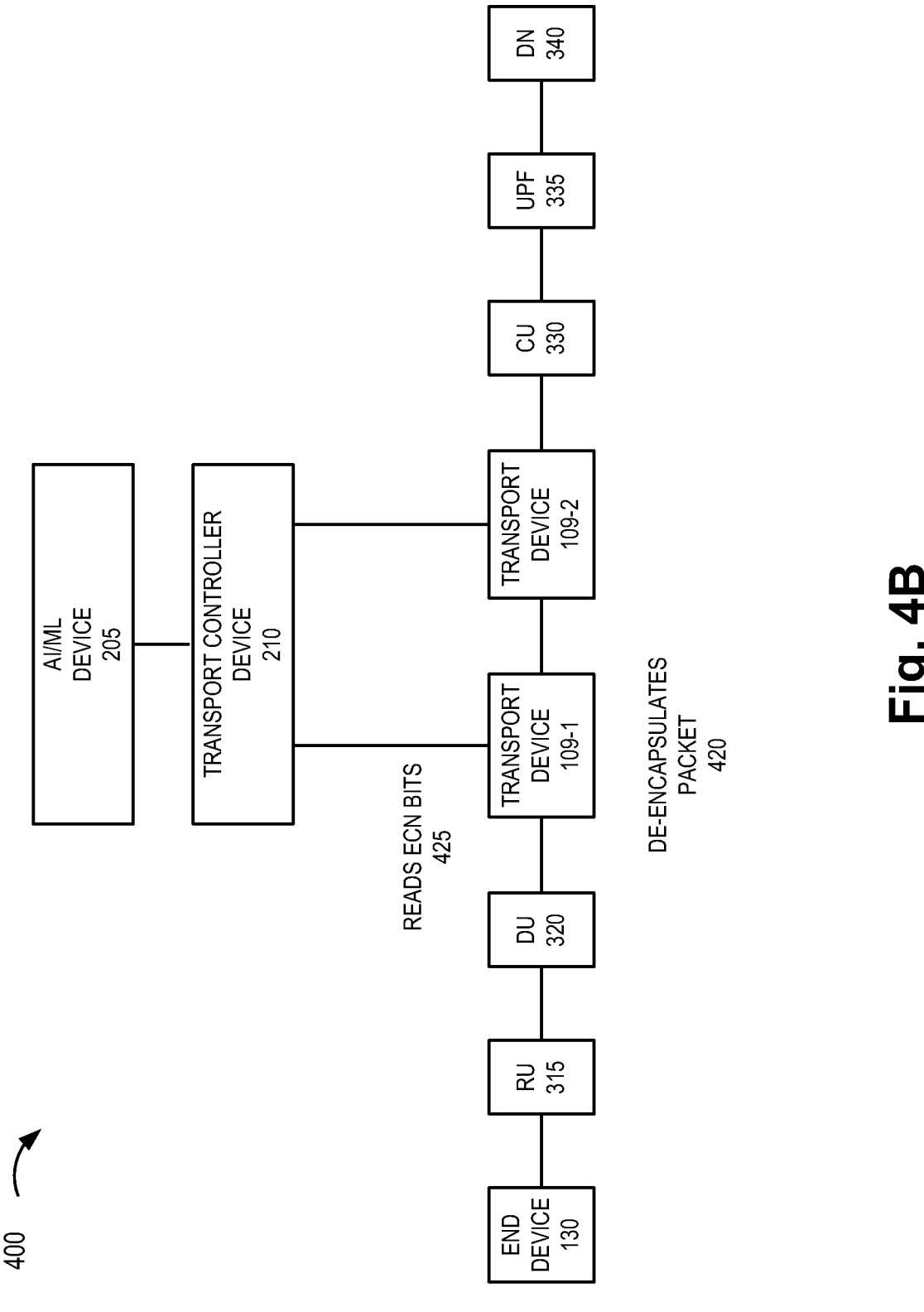

Referring to FIG. 4B, transport device 109-1 may select a packet of the transmitted packets and de-encapsulates the packet 420. According to various exemplary embodiments, when the service is enabled, transport device 109 may select the packet based identifying a flow (e.g., a QoS Flow identifier (QFI)), a QoS value (e.g., a Differentiated Services Code Point (DSCP) value, a Layer 3 type QoS marking, etc.), a 5G QoS Identifier (5QI), a QoS Class identifier (QCI) value, a communication interface, a port, or another network element that may identify L4S traffic, for example, versus other best effort or non-L4S traffic.

As part of the de-encapsulation, transport device 109-1 may remove outer IP messages (e.g., a GTP message, an MPLS message, another type of tunneling protocol, or another outer IP transport message of a protocol stack). Transport device 109-1 may read ECN bits 425 included in an IP packet. For example, transport device 109-1 may inspect the ECN bits included in the IP header, such as in a Type of Service (ToS) field, a DSCP field, an ECN field, or another suitable place or field in the IP packet. The ECN bits may be implemented as two bits, for example.

Figure 4C:
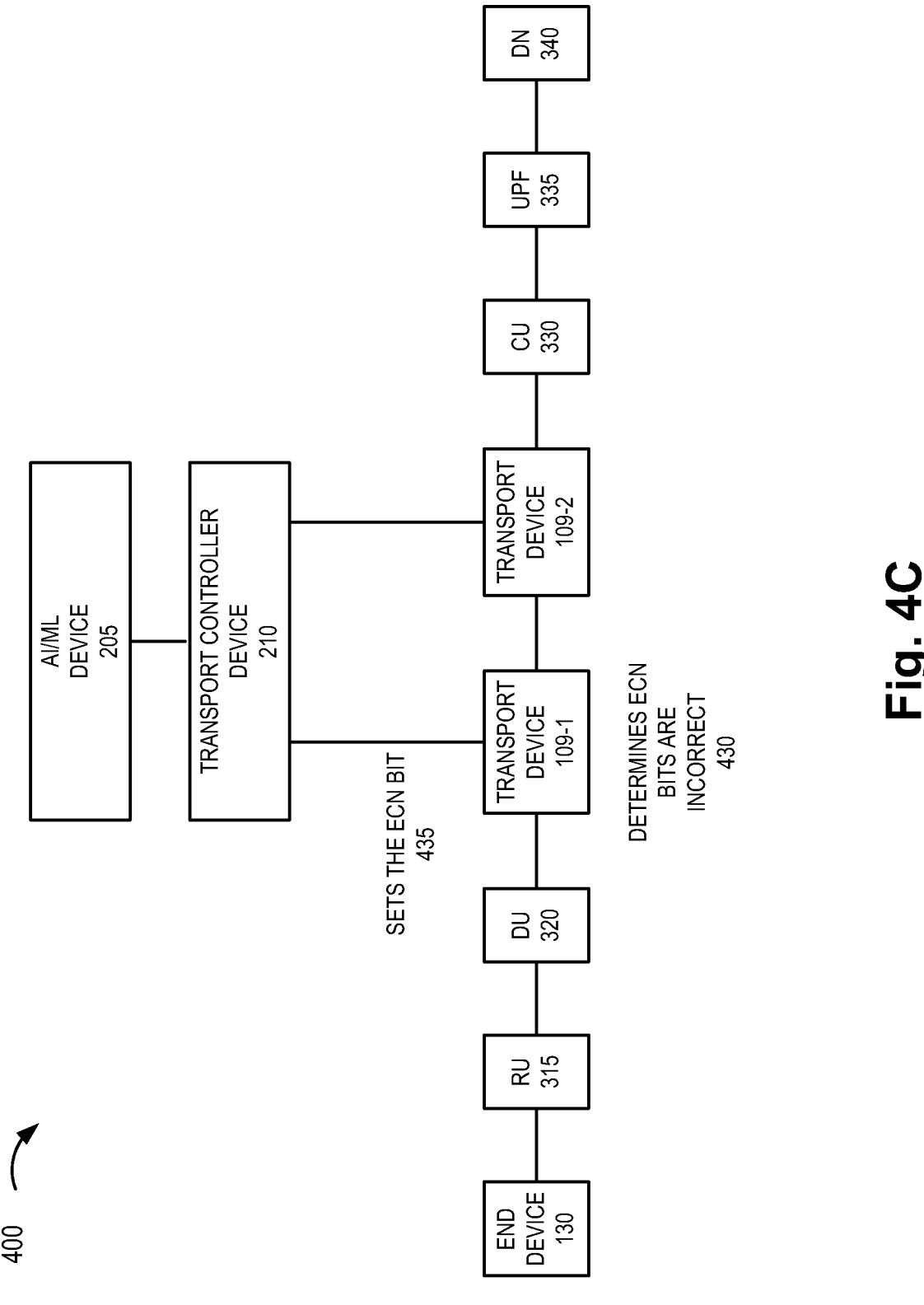

Referring to FIG. 4C, transport device 109-1 may determine that the ECN bits are incorrect 430. For example, transport device 109-1 may determine that the ECN bits do not match the current and/or predictive congestion state. In response, transport device 109-1 may set the ECN bit 435. For example, the ECN bits may not indicate congestion and the determined congestion state is congestion. Transport device 109-1 may change the ECN bits (e.g., "10") to indicate a congested state (e.g., "11"). According to another example, the ECN bits may indicate congestion and the determined congestion state may be no congestion. Transport device 109-1 may change the ECN bits (e.g., "11") to indicate no congestion (e.g., "10"). According to other exemplary scenarios, transport device 109-1 may determine that the ECN bits are correct and match the determined congestion state. According to such a scenario, transport device 109-1 may leave the ECN bits as they are and begin the re-encapsulation process, as described herein.

Figure 4D:
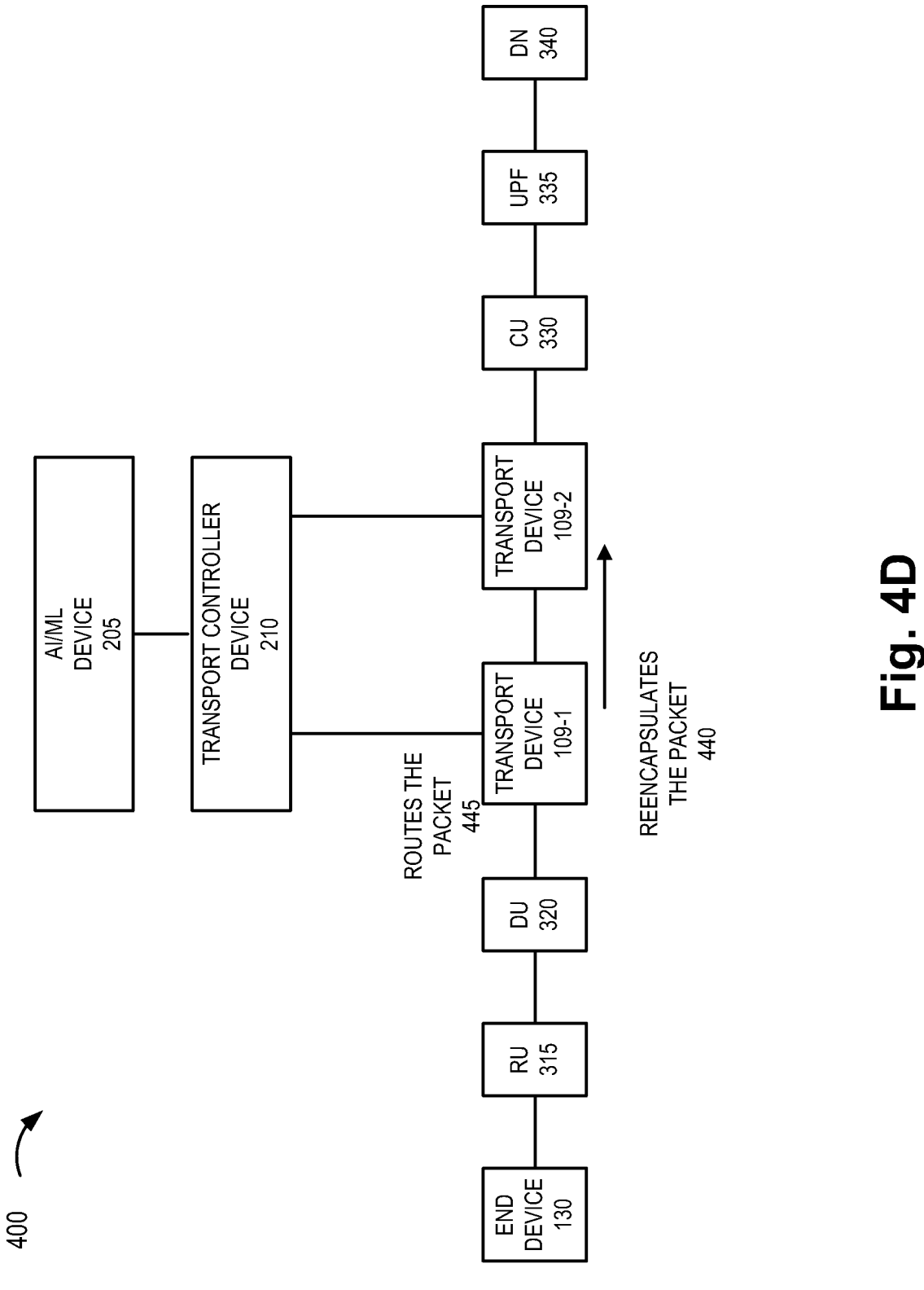

Referring to FIG. 4D, transport device 109-1 may re-encapsulate the outer IP messages to the packet 440. After completion of the re-encapsulation, transport device 109-1 may route the packet 445 towards its destination. Transport device 109-2 may perform a similar process as that described in relation to transport device 109-1 when each of the schedules align.

According to other exemplary embodiments and scenarios, process 400 may include additional operations, fewer operations, and/or different operations that may be performed.

Figure 4E:
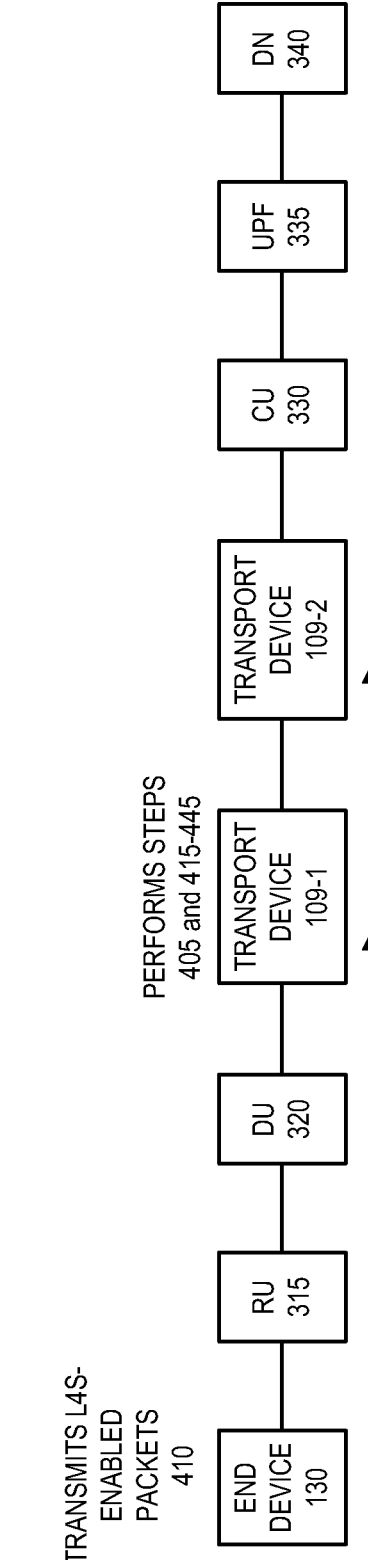
FIG. 4E is a diagram illustrating another exemplary process of an exemplary embodiment of the transport congestion control notification service.

FIG. 4E is a diagram illustrating another exemplary process 460 of an exemplary embodiment of the transport congestion control notification service according to an exemplary scenario. In contrast to process 400 and environment 300, process 460 may be performed in an environment that may not include AI/ML device 205 and transport controller device 210. For example, as described herein, according to some exemplary embodiments of the transport congestion control notification service, the transport device may generate a learned schedule for enabling and disabling the congestion control notification service. For example, the transport device may include on-board congestion detection logic that detects congestion states. For example, the congestion detection logic may include monitoring queues or buffers (e.g., incoming, outgoing) of the transport device and associated date and time information to generate congestion state information. The transport device may further include scheduling logic that generates a schedule based on an analysis of the congestion state information and network topology occurring over a period of time. The schedule may align with anticipatory or prospective congestion and the enabling and disabling of the congestion control notification service, as described herein. As illustrated, for example, end device 130 may transmit L4S-enabled packets 410 and transport device 109-1 may perform steps 405 and 415-445, as previously described.

Figure 5:
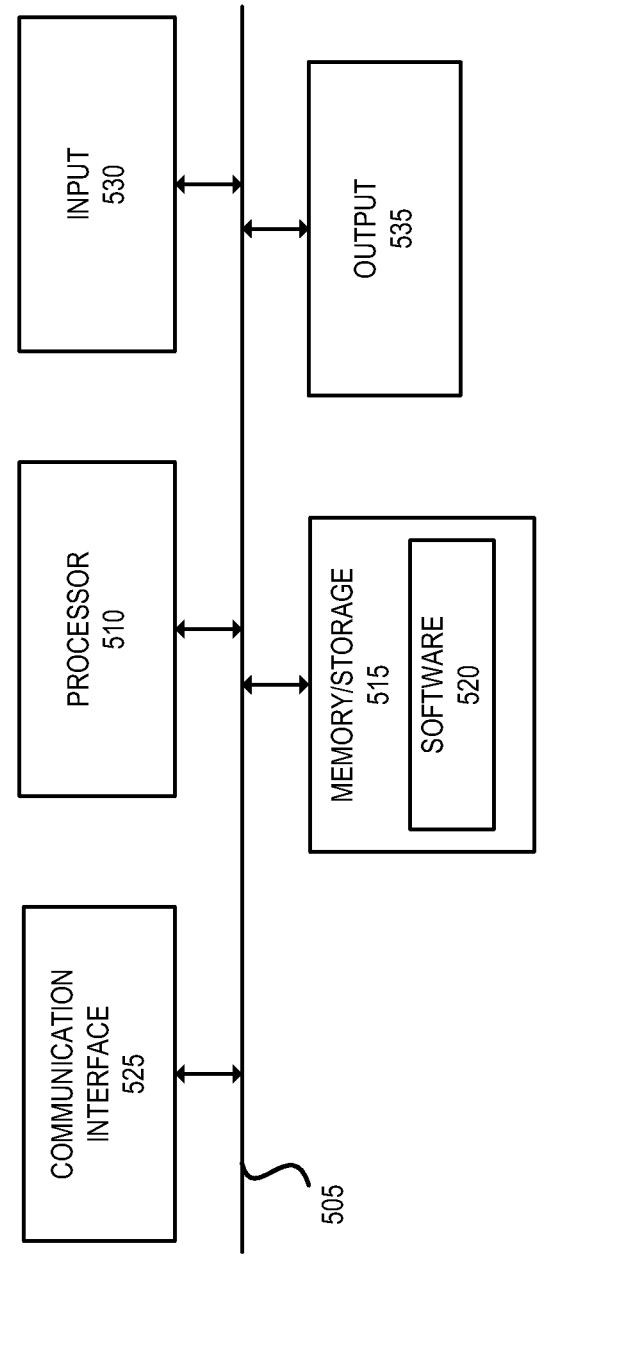
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to access device 107, external device 117, core device 122, transport devices 109/119, 124, congestion controller 125, end device 130, AI/ML device 205, transport controller device 210, RU 315, DU 320, CU 330, UPF 335, and/or other types of devices, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation, or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, learning, model-based, etc.

Memory/storage 515 includes one or multiple memories and/or one or multiple other types of storage mediums. For example, memory/storage 515 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 515 may be external to and/or removable from device 500, such as, for example, a Universal Serial Bus (USB) memory stick, a dongle, a hard disk, mass storage, off-line storage, or some other type of storing medium. Memory/storage 515 may store data, software, and/or instructions related to the operation of device 500.

Software 520 includes an application or a program that provides a function and/or a process. As an example, with reference to transport devices (e.g., transport device 109, transport device 119, transport device 119), software 520 may include an application that, when executed by processor 510, provides a function and/or a process of transport congestion control notification service, as described herein. Additionally, for example, with reference to congestion controller 125, software 520 may include an application that, when executed by processor 510, provides a function and/or a process of transport congestion control notification service, as described herein. Software 520 may also include firmware, middleware, microcode, hardware description language (HDL), and/or another form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces, optical interfaces, and/or wired interfaces. For example, communication interface 525 may include one or multiple transmitters and receivers, or transceivers. Communication interface 525 may operate according to a protocol stack and a communication standard.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, affective, olfactory, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 500 may be implemented in the same manner. For example, device 500 may be instantiated, created, deleted, or some other operational state during its life-cycle (e.g., refreshed, paused, suspended, rebooting, or another type of state or status), using well-known virtualization technologies. For example, access device 107, core device 122, external device 117, the transport device, and/or another type of network device or end device 130, as described herein, may be a virtualized device.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a function or a process described herein. Alternatively, for example, according to other implementations, device 500 performs a function or a process described herein based on the execution of hardware (processor 510, etc.).

Figure 6:
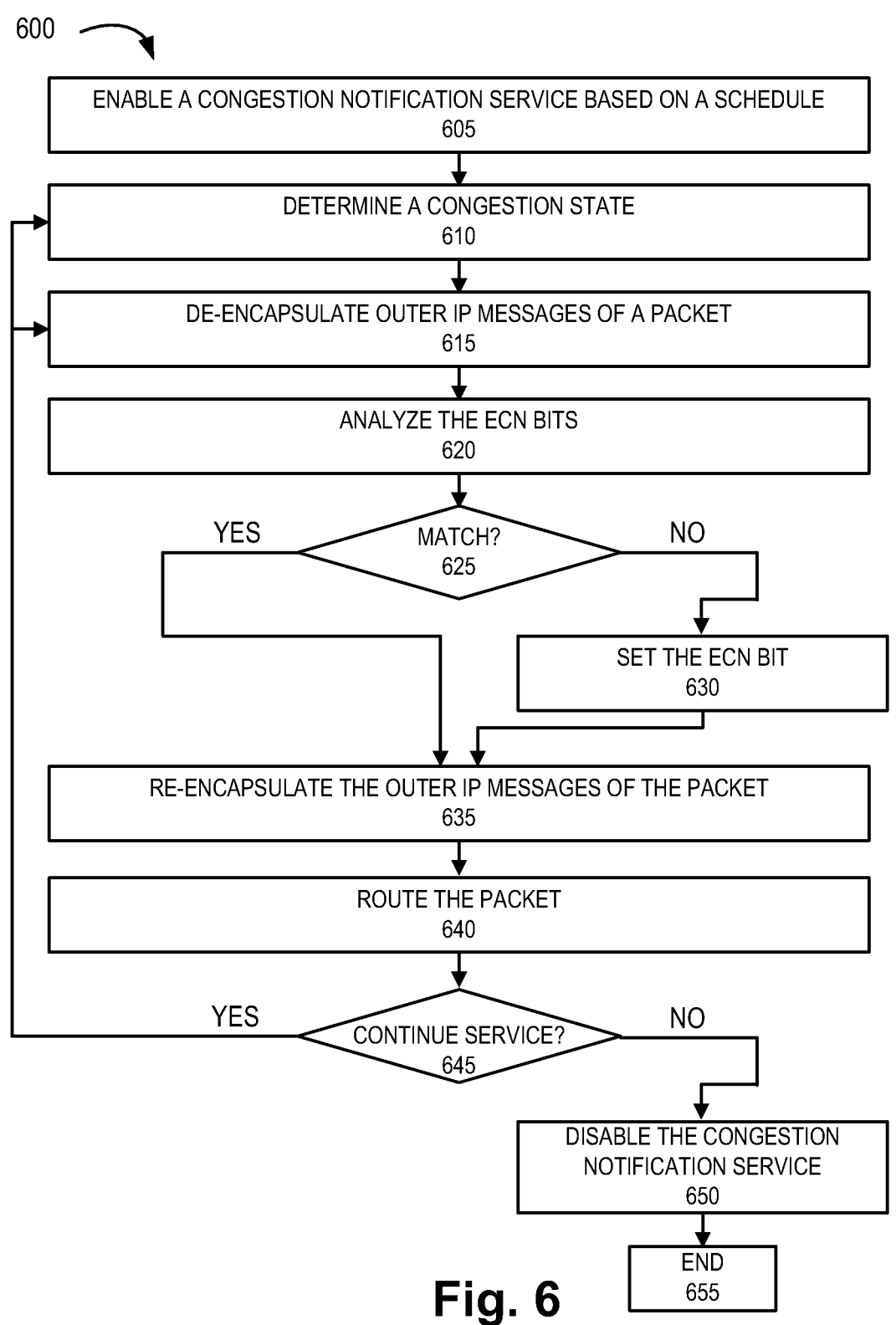
FIG. 6 is a flow diagram illustrating an exemplary process of an exemplary embodiment of the transport congestion control notification service.

FIG. 6 is a flow diagram illustrating an exemplary process 600 of an exemplary embodiment of the transport congestion control notification service. According to an exemplary embodiment, a transport device, such as transport device 109, transport device 119, or transport device 124 may perform process 600. According to an exemplary implementation, processor 510 executes software 520 to perform a step of process 400, as described herein. Alternatively, a step may be performed by execution of only hardware.

In block 605, the transport device may enable a congestion notification service based on a schedule. For example, the transport device may start and stop the congestion notification service based on a schedule that is stored or provisioned on the transport device.

In block 610, the transport device may determine a congestion state. For example, the transport device may use on-board analytics to determine the congestion state, such as a binary choice between no congestion and congestion, or three or more varying degrees or tiers of congestion ranging from no congestion through a highest level of congestion.

In block 615, the transport device may de-encapsulate outer IP messages of a packet. For example, the transport device may remove a GTP message, an MPLS message, or another type of outer IP message from the packet.

In block 620, the transport device may analyze the ECN bits. For example, the transport device may read the ECN bits or the (L4S) ECN bits included in an IP header of the IP packet. For example, the ECN bits may be indicated in a ToS field, a DSCP field, an ECN field, or another suitable place or field in the IP packet.

In block 625, the transport device may determine whether there is a match. For example, the transport device may determine whether the ECN bits match the state of the determined congestion state based on a comparison.

When the transport device determines that there is not a match (block 625-NO), the transport device may set the ECN bit (block 630). For example, the transport device may set the ECN bit(s) to match the determined congestion state. Process 600 may continue to block 635, as illustrated in FIG. 6 and described herein.

When the transport device determines that there is a match (block 625-YES), the transport device may re-encapsulate the outer IP messages of the packet (block 635). In block 640, the transport device may route the packet towards its destination.

In block 645, the transport device may determine whether to continue the service. For example, based on the schedule, the transport device may determine whether the congestion control notification service is to stop based on the schedule.

When the transport device determines the service is to not continue the service (block 645-NO), the transport device may disable the congestion notification service (block 650). Process 600 may end (block 655).

When the transport device determines the service is to continue (block 645-NO), the transport device may return to block 610 or block 615 of process 600. For example, the determination of the congestion state may be relied upon for a certain period of time, such that the transport device may return to block 615 for a certain number of packets. Alternatively, the determination of the congestion state may be performed more frequently.

FIG. 6 illustrates an exemplary process of the transport congestion control notification service, however, according to other exemplary embodiments, the transport congestion control notification service may perform additional operations, fewer operations, and/or different operations than those illustrated and described. For example, the transport device may update a transport routing schedule for packets responsive to the enablement of the congestion control notification service and associated time to provide the congestion notification service (e.g., de-encapsulation, re-encapsulation, resetting ECN bits, etc.).

Figure 7:
FIG. 7 is a flow diagram illustrating another exemplary process of an exemplary embodiment of the transport congestion control notification service.
Figure 7:
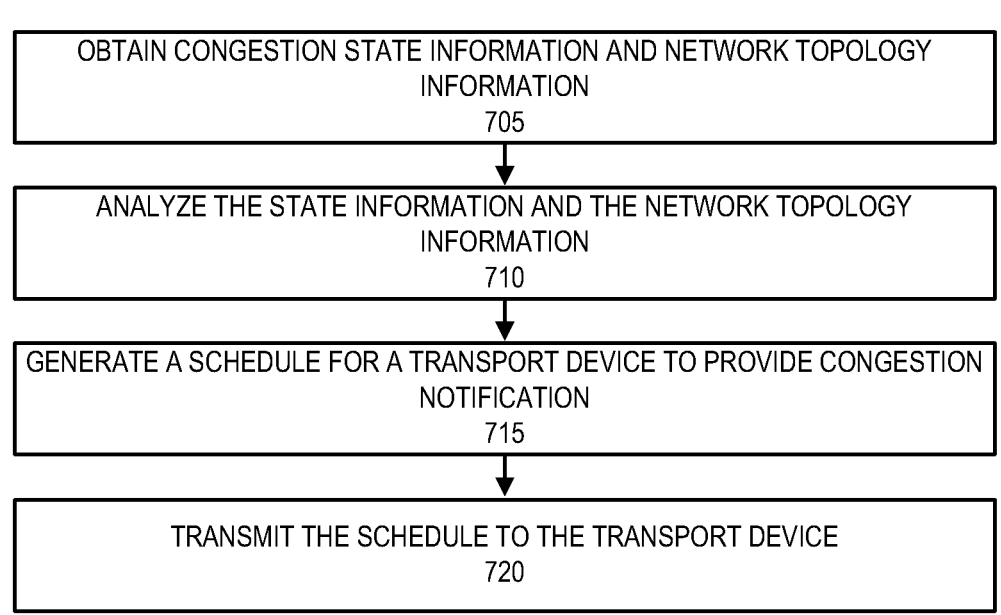

FIG. 7 is a flow diagram illustrating another exemplary process 700 of an exemplary embodiment of the transport congestion control notification service. According to an exemplary embodiment, congestion controller 125 may perform process 700. According to an exemplary implementation, processor 510 executes software 520 to perform a step of process 700, as described herein. Alternatively, a step may be performed by execution of only hardware.

In block 705, congestion controller 125 may obtain congestion state information and network topology information. For example, congestion controller 125 may obtain current and/or predictive congestion state information from one or multiple sources, as described herein. Congestion controller 125 may also store or have access to historical congestion state information. Congestion controller 125 may store or have access to the network topology information of relevance relating to a transport device, as described herein.

In block 710, congestion controller 125 may analyze the state information and the network topology information. For example, congestion controller 125 may use AI/ML logic that analyzes the state and network topology information. Congestion controller 125 may identify future time periods in which congestion may occur at the transport device or relative to a network element of relevance to the transport device.

In block 715, congestion controller 125 may generate a schedule for a transport device to provide congestion notification. For example, the schedule may include data and time information pertaining to the starting and stopping of the congestion control notification service for the transport device. The schedule information may include a network identifier and/or a network address of the transport information.

In block 720, congestion controller 125 may transmit the schedule to the transport device. For example, congestion controller 125 may transmit the schedule to the transport device via transport controller device 210, as described herein.

FIG. 7 illustrates an exemplary process of the transport congestion control notification service, however, according to other exemplary embodiments, the transport congestion control notification service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIGS. 6 and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
enabling, by a network device of a network, a congestion notification service, which includes configuring explicit congestion notification bits for packets, based on a learned schedule;
determining, by the network device, a congestion state;
analyzing, by the network device, explicit congestion notification bits included in an inner message of a packet;
determining, by the network device, that the explicit congestion notification bits do not match the congestion state;
setting, by the network device, the explicit congestion notification bits to indicate the congestion state; and
routing, by the network device, the packet towards a destination.

2. The method of claim 1, further comprising:
disabling, by the network device after the routing, the congestion notification service based on the learned schedule.

3. The method of claim 1, wherein the learned schedule includes start and stop times of the congestion notification service that are based on historical congestion states including congestion and no congestion.

4. The method of claim 3, further comprising:
generating, by the network device, the learned schedule.

5. The method of claim 1, further comprising:
de-encapsulating, by the network device in response to the analyzing, the packet; and
re-encapsulating, by the network device in response to the setting, the packet.

6. The method of claim 1, further comprising:
updating, by the network device, a transport routing schedule for packets based on the enabling and associated time to provide the congestion notification service.

7. The method of claim 1, wherein the congestion notification service pertains to Low Latency Low Loss and Scalable Throughput (LAS) traffic.

8. The method of claim 1, wherein the network device is a router located in a radio access network or a core network, and the congestion state indicates congestion or no congestion.

9. A network device comprising:
a processor that is configured to:
enable a congestion notification service, which includes configuring explicit congestion notification bits for packets, based on a learned schedule;
determine a congestion state;
analyze explicit congestion notification bits included in an inner message of a packet;
determine that the explicit congestion notification bits do not match the congestion state;
set the explicit congestion notification bits to indicate the congestion state; and
route the packet towards a destination.

10. The network device of claim 9, wherein the processor is further configured to:
disable, after the routing, the congestion notification service based on the learned schedule.

11. The network device of claim 9, wherein the learned schedule includes start and stop times of the congestion notification service that are based on historical congestion states including congestion and no congestion.

12. The network device of claim 11, wherein the processor is further configured to:
generate the learned schedule.

13. The network device of claim 9, wherein the processor is further configured to:
de-encapsulate in response to the analysis, the packet; and
re-encapsulate in response to the setting, the packet.

14. The network device of claim 9, wherein the processor is further configured to:
update a transport routing schedule for packets based on the enablement and associated time to provide the congestion notification service.

15. The network device of claim 9, wherein the congestion notification service pertains to Low Latency Low Loss and Scalable Throughput (L4S) traffic.

16. The network device of claim 9, wherein the network device is a router located in a radio access network or a core network, and the congestion state indicates congestion or no congestion.

17. A non-transitory computer-readable storage medium storing instructions executable by a processor of a network device, wherein the instructions are configured to:

enable a congestion notification service, which includes configuring explicit congestion notification bits for packets, based on a learned schedule;

determine a congestion state;

analyze explicit congestion notification bits included in an inner message of a packet;

determine that the explicit congestion notification bits do not match the congestion state;

set the explicit congestion notification bits to indicate the congestion state; and route the packet towards a destination.

18. The non-transitory computer-readable storage medium of claim 17, wherein the instructions are further configured to:

disable, after the routing, the congestion notification service based on the learned schedule.

19. The non-transitory computer-readable storage medium of claim 17, wherein the learned schedule includes start and stop times of the congestion notification service that are based on historical congestion states including congestion and no congestion.

20. The non-transitory computer-readable storage medium of claim 17, wherein the congestion notification service pertains to Low Latency Low Loss and Scalable Throughput (LAS) traffic.

\* \* \* \* \*